May 11, 1965

E. W. ARENDS 3,183,412

SWITCHING DEVICE FOR IMPEDANCES WITH INDUCTIVE CHARACTER

Filed Jan. 22, 1962

INVENTOR.
ERIK W. ARENDS
BY
Hugh A. Kirk
ATTY.

United States Patent Office 3,183,412

Patented May 11, 1965

3,183,412

SWITCHING DEVICE FOR IMPEDANCES WITH INDUCTIVE CHARACTER

Erik W. Arends, Amstelveen, Netherlands, assignor to N.V. Electrologica, Rijswijk (Z.H.), Netherlands Filed Jan. 22, 1962, Ser. No. 167,839
13 Claims. (Cl. 317—123)

The present invention relates to an electronic device for switching on and off one or more impedances with an inductive character.

A very important field where switching systems according to this invention can be used is found in the input and output equipment of machines for data processing, for instance tape readers and tape punchers. These apparatus are used also in the communication field as well as in computors and translating machines including coding and de-coding machines.

It is an object of this invention to design such a device so that the transition from one steady state to another is completed in a short time interval, thereby avoiding a high supply voltage and using the supply source in a most efficient manner.

A further object is to produce a simple circuit arrangement that consists of a small number of parts and can be assembled with a minimum of labour.

The main object is reached by distributing the switching function of each of the impedances in the system over two switches; one of said switches being connected in series with one of the impedances, the other being arranged so that it can shunt said series connection, the switches being actuated antiphase-wise, simultaneously oppositely, alternately, or in push-pull relationship.

Generally speaking this invention comprises an alternate ON and OFF switching device for one or a pair of impedance control coils, such as for example, like those employed in the starting and stopping of a code perforated paper tape as it is fed through a reader or a puncher for making the perforations therein. More specifically, the essential features of this device comprise (*a*) a power source, preferably D.C., having two terminals, (*b*) a pair of, preferably equal, inductances connected in parallel to one terminal, (*c*) at least one impedance control coil connected in series with at least one of said inductances, and preferably a pair of impedance control coils one connected to each of said inductances, and (*d*) connected between each of said pair of inductances and the other terminal of said power source, a pair of switching means operable that when one is open the other is closed and vice versa. These switching means may comprise a pair of mechanically interconnected switches or a pair of transistors bridged by either one or more Zener diodes, a pair of condensors, and/or a pair of oppositely directed rectifiers connected between said switching means and said pair of impedances. Thus there is means to insure that when one of the switching means is open the other is closed, and when one of the switching means connects an impedance coil in parallel with one of said pair of inductances, the other switching means bridges said impedance to said other one of said pair of inductances.

The invention itself will best be understood by reference to the following description, taken in connection with the accompanying drawing.

Figure 1:
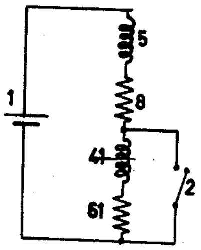
FIG. 1 shows a theoretically possible circuit arrangement producing a short transition time, not fulfilling all requirements set out above, but suitable as a starting point for the illustration of the present invention.

Referring first to the wiring diagram of FIG. 1, between the terminals of a D.C. supply source 1 are connected in series with the inductance coil 5, the ohmic resistance 8, the inductive impedance 41, and the ohmic resistance 61, with a switch 2 short-circuiting the series combination of impedance 41 and resistance 61.

This circuit arrangement is a hypothetical one that can be found in mathematical textbooks on operational methods. See for instance "Carslaw and Jäger: Operational Methods in Applied Mathematics," 2nd edition, Oxford University Press, pages 32, 33 and 245.

This circuit operates as follows:

Suppose that switch 2 is closed when $t<0$, i.e. before switching, and switch 2 is open when $t>0$, i.e. during or after switching. Then the current $i_{41}$ in the impedance 41 when $t<0$ is $$i_{41}=0$$

and when $t>0$, it is $$i_{41}=\frac{E}{R_3+R_{61}}+E\frac{L_5R_{61}-L_{41}R_8}{R_8(L_5+L_{41})(R_8+R_{61})}e^{-\alpha t}$$

if $$\alpha=\frac{R_8+R_{61}}{L_5+L_{41}}$$

and $R_n$, $L_m$ are the value of the ohmic resistances and the self inductances of the resistances and the coils designed by the subscripts *n* and *m*.

For $t>0$, the current $i_{41}$ tends to the limit $(t\rightarrow\infty)$ so that $$i_{41}=\frac{E}{R_8+R_{61}}$$

when $L_5R_{61}=L_{41}R_8$, i.e. $L_5=L_{41}$ and $R_8=R_{61}$, or the current $i_{41}$ reaches its final value instantaneously.

If the value of $L_5R_{61}-L_{41}R_8$ is positive (i.e. $>0$) the initial value of $i_{41}$ is larger than the final value. Then the value of $i_{41}$ decreases exponentially to $$\frac{E}{R_8+R_{61}}$$

(i.e., it overshoots). This example, which is a purely mathematical curiosity, can be interpreted physically.

When switch 2 is closed ($t<0$) the current in coil 5 is $$i_5=\frac{E}{R_8}$$

The magnetic flux is then $$\phi = L_5 i_5 = \frac{EL_5}{R_8}$$

The magnetic flux in $L_{41}$ is zero because of $i_{41}=0$.

When switch 2 is opened both inductances 5 and 41 will offer resistance against change of the magnetic field and if ideal resistances and coils are used the voltage at the point where resistance 8 and coil 41 are connected with switch 2 will become infinite. When $i_{41}$ increases the voltage will decrease. Immediately after the switch 2 is opened the voltage operating on coil 41 is many times larger than the supply voltage E so that the current in 41 increases rapidly.

As when $t<0$ a steady current $i_5$ flows in $L_5$, the magnetic energy in the coil equals $\frac{1}{2}L_5 i_5^2$. Therefore $L_5$ is to be considered as an energy reservoir for coil 41. A proportion of the energy of coil 5 is transferred to coil 41, a further proportion remains in coil 5 and the remainder is partly dissipated in the resistances 8 and 61 and partly radiated.

As the transition takes place in a very short interval of time the energy dissipated in the resistances can be neglected.

The here described circuit arrangement cannot be used in practice and it will be shown hereunder how this theoretical circuit that so far is not much more than a mathematical curiosity can be modified and improved, so that the energy stored in coil 5 can be used for technical purposes. The coils wherein the energy is stored will herebelow be referred to as auxiliary inductances.

In the mathematical discussion of the circuit of FIG. 1, only a rapid increase of the current is considered. The energy flow has not been considered.

If it is supposed that $L_5R_{61}-L_{41}R_8=0$, and if $L_{41}$ and $R_{61}$ have given values, $L_5$ or $R_8$ can be chosen arbitrarily.

If the efficiency is taken into account the optimum value of $R_8$ can be calculated. This value depends on two parameters, the value of the current $i_5$, which flows in the stationary state and the proportion of the active and the non-active period of the cycle.

A judicious choice of the parts which are used is very important. A further imperfection of FIG. 1 is that when the switch 2 is closed, the current $i_{41}$ will not decrease rapidly to zero but rather slowly. The switch short circuits the elements 41 and 61 and the coil will only be discharged in the time determined by the values of $L_{41}$ and $R_{61}$.

Moreover ideal switches do not exist. In the circuit of FIG. 1 a spark or any other form of breakdown will occur. If transistors are used as switches a breakdown will destroy them at once.

Here below the measures will be described by which the imperfections of the circuit of FIG. 1 are removed. By these measures a technically useful switching system is created.

Figure 2:
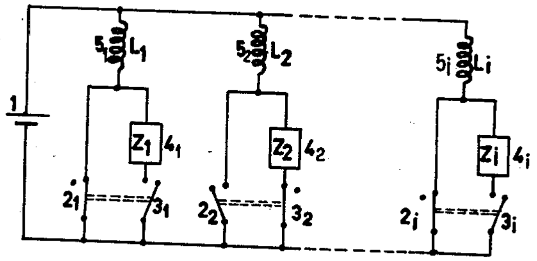
FIG. 2 is a wiring diagram of a very simple arrangement of one embodiment of this invention shown, in plurality, connected across an energy source.

In FIG. 2, between the terminals of power supply 1 are connected in series the auxiliary inductance $5_1$, the impedance 4 which is to be switched on and off, and the switch $3_1$. The elements $3_1$ and $4_1$ are short circuited by the switch $2_1$ when it is closed. A plurality of opposite pairs $5_1$, $4_1$, $3_1$ and $5_2$, $4_2$, $3_2$ of such series circuits may be connected in parallel across the terminals of source 1 as shown in FIG. 2. The switches $2_1$ and $3_1$ are actuated oppositely and simultaneously by conventional means. Rotatable switches driven by a common shaft can be used, as well as the make- and break-contacts of a relay, or thermionic tubes, or transistors.

The switching function is divided between both switches $2_1$ and $3_1$. If switch $3_1$ is closed coil $4_1$ is energized. Opening switch $2_1$ causes a temporary very high voltage across coil $4_1$. If switch $3_1$ is opened, coil $4_1$ is de-energized in a very short time and the simultaneous closing of switch $2_1$ energizes the auxiliary impedance $5_1$ rapidly.

When the impedance $4_1$ is cut off a current still flows in the auxiliary impedance $5_1$ and the switch $2_1$, which current is not much larger than the current in the other half of the cycle of the operating period. This circuit is very efficient energetically because the same rise-time of the current in impedance $4_1$ can only be obtained by conventional methods if the voltage of the power supply is much higher. Due to these secondary effects, the voltage at the point of connection of the impedances $4_1$ and $5_1$ will not rise to infinity, but voltages twenty or more times as high as the voltage of the supply source can be realised.

The same transition time as is realised by a temporary voltage increase to the twentyfold value of the voltage of the supply source can only be obtained by the conventional method by increasing the voltage of the supply source to its twentyfold value. This means that the required energy is twenty times as large as the energy dissipated in the impedance $4_1$ such as a relay. In the arrangement according to the invention the energy delivered by the supply source 1 is only twice the energy dissipated in the impedances $4_1$ and $5_1$ in the active period.

A further saving is obtained due to the fact that the switches handle less energy so that the amplifier for actuating the switches requires less power. Moreover the load of the supply shows smaller fluctuations. Compared with FIG. 1 the time interval required to switch off coil $4_1$ is considerably shortened.

Figure 3:
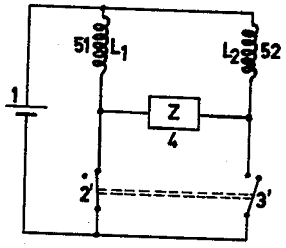
FIG. 3 is a wiring diagram of another embodiment of this invention, similar to that shown in FIG. 2, for providing rapid reversal of the current through a single impedance.

If it is required that the current is coil 4 is reversed rapidly, the circuit illustrated in FIG. 3 can be used. In this circuit two auxiliary impedances 51 and 52 are used. The number of switches remains the same however. The circuit of FIG. 3 is derived from that of FIG. 2 by connecting a further auxiliary impedance in parallel with impedance $5_1$. These impedances 51 and 52 function in turn as elements for storing energy. They function in turn as energy-store.

The impedance 4 can be the energizing coil of a polar relay or the field coil of an electromotor. In some cases the impedance 4 can consist of a plurality of elements.

Figure 4:
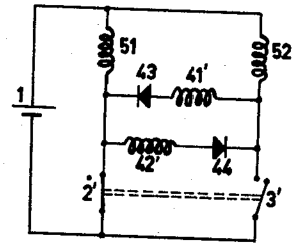
FIG. 4 is a wiring diagram of a modification of the circuit shown in FIG. 3, wherein the impedance comprises a parallel pair of oppositely conductive impedance coil circuits.

If the impedance 4 consists of two branches connected in parallel, each of these branches comprising a non-linear element, the circuit can be designed in such a manner that a current of given polarity is carried mainly by one of these branches and a current of reversed polarity by the other branch. An embodiment wherein two inductances are switched alternatively is shown in FIG. 4. Each branch 41′, 43 and 42′, 44 comprises respectively, an inductance coil in series with a rectifier. The rectifiers 43, 44 are so connected that the direction of the current that can flow through the coil 41′ is the reverse of that in coil 42′. If the switches 2′ and 3′ are actuated oppositely and simultaneously the current is carried in turn by the coils 41′ and 42′.

If the impedances 51 and 52, as well as the impedances 41′ and 42′ have the same character and the diodes 43 and 44 are similar, the load of the supply source 1 will be uniform.

Figure 5:
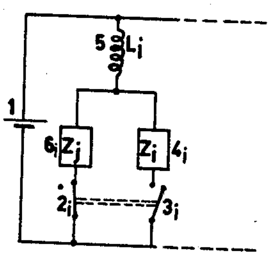
FIG. 5 is a wiring diagram of an embodiment of this invention similar to that shown in FIG. 2, in which a uniform load is provided in each branch of the two switching circuits.

In the circuit of FIG. 5 the load is also uniform. This circuit is a modification of the circuit illustrated in FIG. 2. The impedance $Z_j(6)$ is connected in series with the switch $2_1$ and the ohmic resistances of the impedances $4_1$ and $6_1$ have the same value.

Figure 6:
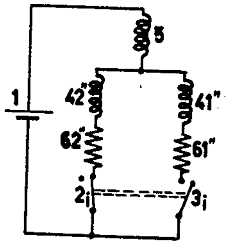
FIG. 6 is a wiring diagram of a modification of the circuit shown in FIG. 5, wherein the impedances are shown to comprise an equal pair of inductance and resistance combinations.

FIG. 6 shows the same circuit as FIG. 5, wherein the impedances $6_1$ and $4_1$ are replaced by the series connections of the impedance 42″ and the resistance 62″, and impedance 41″ and resistance 61″, respectively. The resistances 62″ and 61″ can wholly or in part be constituted by the resistance of the inductance coils 42″ and 41″.

In the circuits of FIGS. 5 and 6 the two impedances with inductive character can ge switched oppositely and simultaneously by switches $2_1$ and $3'_1$.

Obviously the same reversal of function can be obtained with the circuit of FIG. 2, if two sets of impedances $5_1$, $5_2$ and $4_1$, $4_2$ are used, and two pairs of oppositely and simultaneously actuated switches $2_1$, $3_1$ and $2_2$, $3_2$ are used. Here also a uniform load of the supply source 1 is obtained. Instead of two switches the system of FIG. 2 requires four switches. As the switches $2_1$, $3_1$ and $2_2$, $3_2$ are rather expensive parts, the circuits of FIGS. 4 and 6 are preferred wherein the same reversal functions are obtained by half the number of switches.

The circuit of FIG. 6 requires less parts than the circuit of FIG. 4, especially in cases where the resistances 62″, 61″ can be omitted. Then one auxiliary inductance and two diodes are saved and for some applications this saving can be important. On the other hand the properties of the circuit of FIG. 4 are such that in many cases this circuit is preferred.

Firstly it is hardly conceivable that two exactly equal impedances can be made and secondly ideal switches are not available.

Due to the unavoidable imperfections of said parts, the transition periods cannot be infinitely short and moreover both transition periods will not necessarily be equal in the circuit of FIG. 6.

In the circuit of FIG. 4 the elements 41′, 43, 42′ and 44 form a closed path way wherein a current can circulate. This means that each of the inductances 41′, 42′ can act as an auxiliary inductance for the other of the pair.

The mutual energy transfer which is thus made possible enables the transition periods for both inductances to be exactly equal so that an ideal alternate energizing of the inductances can be obtained while the circuit of FIG. 6, ideal switching is obtained only approximately.

A further difference in performance between the systems of FIG. 4 and FIG. 6 is that, if the same switches are used, the transition periods in the circuit of FIG. 4 are shorter than in FIG. 6.

Here below some numerical examples of the transition times of a conventional circuit and of two circuits embodying the invention, are given. It is supposed that all switches have the same breakdown voltage $kE$ and that the supply voltage E in all three examples has the same value.

($a$) In a conventional circuit comprising an inductance coil with self-inductance L and resistance R without auxiliary inductance, the time constant is $$t_1=\frac{L}{R}$$

and in the period $t_1$ the current reaches a value equal to 70% of the final value.

($b$) In a circuit of FIG. 6, suppose that the ohmic resistance of the auxiliary impedances is R, and R is large compared with the ohmic resistances of the impedances to be switched on and off, we find for the time $t_2$ required for the current to reach 75% of its final value, the expression $$t_2=\frac{2L}{kR}$$

if L is the self-inductance. For $k$ larger than 2 the transition time is shorter than in the conventional circuit. In actual practice $k$ can be several times larger than 2.

($c$) In the circuit of FIG. 4, the time $t_3$ required for the current to reach its final value can be represented with very good approximation by $$t_3=\frac{L}{kR}$$

If switches of the same quality are used as in the circuit discussed under example ($b$) above, the transmission time is less than half that of the last mentioned circuit in example ($c$).

In an embodiment that has been used in practice with very satisfactory results $L$ was 1 mh.±5%

$R$ was 5 ohms±1%

$E$ was 16 volts±0.5%

The breakdown voltage of the switch was fixed at 60 volts by means of a Zener diode. The theoretical value of $t_3$ is:

$$t_3=\frac{16.10^{-3}}{60.5}\text{ sec.}=53\mu\text{ sec.}\pm 6\%$$

This theoretical value was checked with the aid of a cathode ray oscilloscope. The value of $t_3$ observed in this measurement was 60 $\mu$sec.±10%, so that the agreement between theory and experiment is satisfactory.

In the experiment the rise of the current was substantially linear, so that a current, equal to 70% of the final value was reached in $0.7t_3=37$ $\mu$sec.

In the circuit, discussed under example ($a$) above, the time to reach 70% of the final value was 200 $\mu$sec., in that discussed under example ($b$) above, 75% of the final value was reached in 107 $\mu$sec.

For the sake of completeness it may be observed that the circuits of FIGS. 2, 3 and 5 have the same transition times as FIG. 4 if non-ideal, that is if normal switches are used and impedance $6_1$ of FIG. 5 is an ohmic resistance.

From the above discussion it will be clear that a surprising improvement is realised by the invention and that no disadvantages, which frequently accompany new developments, are introduced.

Figure 7:
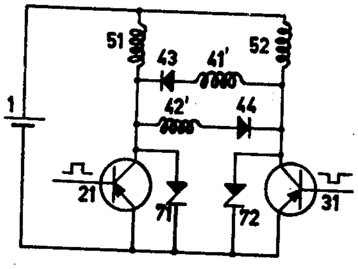
FIG. 7 is a wiring diagram of a further embodiment of the invention, similar to that shown in FIG. 4, wherein the switches have been replaced by transistor-Zener diode combinations.
Figure 8:
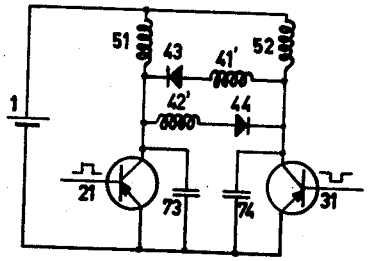
FIG. 8 is a wiring diagram of a modification of the circuit shown in FIGS. 4 and 7, wherein the switches have been replaced by transistor-condenser combinations.

In FIGS. 7 and 8, two further embodiments of the invention are illustrated, which have been used with outstanding results for a considerable time in a punched paper tape-reader associated with a digital computer.

In FIG. 7 electronic switches consisting of a parallel combination of a transistor 21 or 31 and a Zener-diode 71 or 72 are illustrated. The electrical values of various elements are given here below.

| | |
|---|---|
| Auxiliary inductances | 5 mh., 2.5 ohms. |
| The inductances to be switched | 1 mh., 0.5 ohm. |
| Break down voltage of Zener-diode | 60 volts. |
| Supply voltage | 6 volts. |
| Acceleration of switching compared with the conventional system approximately 14 times. | |

The Zener-diodes fix the breakdown voltage of the switches at a value below the breakdown voltage of the transistors in order to prevent the transistors from being destroyed. If the positive terminal of the power supply source 1 is connected to ground, the Zener-diode 71 or 72, which is connected between the collector of the transistor 21 or 31, respectively, and ground, can be replaced by a normal diode connected between said collector and a battery 1 or similar D.C. source with a voltage of 60 volts.

This arrangement can save costs if the computer to which the tape-reader is associated, is provided with a D.C. source of the required voltage.

In FIG. 8 the switches consist of the parallel combination of transistor 21 and condenser 73 and transistor 31 and condenser 74. In this embodiment the peak voltage of the collector is also limited.

The condensers 73, 74 may be formed by the combination of the self-capacitance of the coils and the output capacitance of the transistors 21, 31 respectively. Of course an additional condenser may be used and the coils can be wound to have a large self-capacitance. For the alternate switching of two magnetic relays the conventional circuit requires the following elements to realise the switching operation:

1 supply source,
2 transistors for switching purposes,
2 resistances.

The arrangement according to FIG. 8 requires:

1 supply source,
2 transistors for switching purposes,
2 auxiliary inductivities which can be fabricated at low costs,
2 semiconductor rectifiers.

If electron tubes are used for switching purposes no special measures to prevent breakdown are required.

If electron tubes are used, high values of $k$ can be obtained and then the circuit of FIG. 6 is preferable.

The following elements are required in this case:

1 supply source,
2 electron tubes (for instance triodes),
1 auxiliary inductivity.

In order to have a high value of $k$, the self-capacitance of the auxiliary inductance should be small in this case.

Punched papertape-readers according to the diagrams of FIGS. 7 and 8 can read faultless with speeds of more than 1500 characters per second with an energy dissipation of 75 watts. Such speeds are impossible with conventional apparatus because of the fact that they would require some 600 to 800 watts. This means an intolerable heat-dissipation in a punched papertape-reader of normal dimensions.

While there is described above the principles of this invention in connection with specific apparatus, it is to be clearly understood that this description is made only by way of example and not as a limitation to the scope of this invention.

What is claimed is:

1. An alternate OFF and ON switching circuit for at least one impedance control coil comprising:
(A) a power source having two terminals,
(B) a pair of inductances connected at one of their ends to one terminal of said source,
(C) an impedance control coil means connected to the other end of at least one of said inductances,
(D) a pair of switching means each connected on one of their sides to the other terminal of said source, and each connected on their other sides to the opposite ends of said impedance control coil means, and
(E) means connected to each of said switching means to insure that when one of said switching means is closed the other is open, and vice versa, whereby one of said switching means connects said other power source terminal to said one of said inductances while the other of said switching means connects said same other power source terminal to said impedance control means and vice versa, respectively.

2. A circuit according to claim 1 including a pair of impedance coils, one being connected to the other end of each of said inductances.

3. A circuit according to claim 1 wherein said power source is a direct current power source.

4. A circuit according to claim 1 wherein said pair of inductances are substantially equal.

5. A circuit according to claim 2 wherein said pair of impedances are substantially equal.

6. A circuit according to claim 1 wherein said pair of switching means comprises a pair of manually operated switches mechanically connected together.

7. A circuit according to claim 1 wherein said switching means comprises a pair of transistors.

8. A circuit according to claim 7 wherein said means to insure opposite and simultaneous operation of said switching means comprises a pair of opposite diodes connected to the collectors of said transistors.

9. A circuit according to claim 8 wherein said transistors include at least one Zener diode in parallel therewith.

10. A circuit according to claim 8 wherein each said transistor includes a condenser in parallel therewith.

11. A circuit according to claim 1 wherein said switching means reverses the current through said impedance coil.

12. A circuit according to claim 1 wherein the impedance control coil comprises a relay.

13. A circuit according to claim 2 wherein said impedance control coil means is connected between said other ends of said pair of inductances.

References Cited by the Examiner

UNITED STATES PATENTS

| | | | |
|---|---|---|---|
| 2,941,125 | 6/60 | Lippincott | 317—123 |
| 2,951,186 | 8/60 | Dickinson | 317—155.5 X |
| 3,140,427 | 7/64 | Freiberg | 317—148.5 |

FOREIGN PATENTS

| | | |
|---|---|---|
| 836,060 | 6/60 | Great Britain. |
| 842,219 | 7/60 | Great Britain. |

SAMUEL BERNSTEIN, *Primary Examiner.*